United States Patent
Raj et al.

(10) Patent No.: US 10,496,824 B2
(45) Date of Patent: Dec. 3, 2019

(54) TRUSTED LANGUAGE RUNTIME ON A MOBILE PLATFORM

(75) Inventors: Himanshu Raj, Issaquah, WA (US); Nuno Santos, Saarbruecken (DE); Paul England, Bellevue, WA (US); Stefan Saroiu, Redmond, WA (US); Alastair Wolman, Seattle, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 723 days.

(21) Appl. No.: 13/167,699

(22) Filed: Jun. 24, 2011

(65) Prior Publication Data
US 2012/0331550 A1 Dec. 27, 2012

(51) Int. Cl.
*G06F 21/57* (2013.01)
*G06F 21/53* (2013.01)

(52) U.S. Cl.
CPC ............ *G06F 21/575* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 7,069,442 B2 | 6/2006 | Sutto et al. | |
| 7,203,833 B1 * | 4/2007 | Abadi et al. | 726/22 |
| 7,380,276 B2 * | 5/2008 | Saha | G06F 21/53 726/22 |
| 7,624,111 B2 * | 11/2009 | Reddish | G06F 21/53 |
| 8,117,642 B2 | 2/2012 | Covey et al. | |
| 2002/0184520 A1 * | 12/2002 | Bush | G06F 21/53 726/6 |
| 2004/0210760 A1 | 10/2004 | Mcgrath et al. | |
| 2005/0034099 A1 | 2/2005 | Spooner | |
| 2005/0273605 A1 * | 12/2005 | Saha | G06F 21/53 713/166 |
| 2005/0289311 A1 * | 12/2005 | Durham et al. | 711/163 |
| 2006/0090084 A1 * | 4/2006 | Buer | 713/189 |
| 2007/0199046 A1 * | 8/2007 | O'Brien | 726/2 |

(Continued)

OTHER PUBLICATIONS

Nuno Santos, Himanshu Raj, Stefan Saroiu, Alec Wolman "Trusted Language Runtime (TLR): Enabling Trusted Applications on Smartphones," HotMobile 2011, Mar. 1-2, 2011.*

(Continued)

*Primary Examiner* — Kaveh Abrishamkar
(74) *Attorney, Agent, or Firm* — Fiala & Weaver P.L.L.C.

(57) ABSTRACT

Disclosed is a trusted language runtime (TLR) architecture that provides abstractions for developing a runtime for executing trusted applications or portions thereof securely on a mobile device (e.g., a smartphone). TLR offers at least two abstractions to mobile developers: a trustbox and a trustlet. The trustbox is a runtime environment that offers code and data integrity, and confidentiality. Code and data running inside a trustbox cannot be read or modified by any code running outside the trustbox. A trustlet is the code portion of an application that runs inside a trustbox. With TLR, programmers can write applications in .NET and specify which parts of the application handle sensitive data, and thus, run inside the trustbox. With the TLR, the developer places these parts in a trustlet class, and the TLR provides all support needed to run the parts in the trustbox.

24 Claims, 10 Drawing Sheets

(56) References Cited

U.S. PATENT DOCUMENTS

| | | | |
|---|---|---|---|
| 2007/0220494 | A1 | 9/2007 | Spooner |
| 2008/0005794 | A1* | 1/2008 | Inoue et al. ............... 726/22 |
| 2009/0282477 | A1* | 11/2009 | Chen et al. ............... 726/22 |
| 2010/0011446 | A1* | 1/2010 | Klucher ............ G06F 21/10 726/27 |
| 2010/0100591 | A1 | 4/2010 | Mahaffey et al. |
| 2010/0106926 | A1* | 4/2010 | Kandasamy ........ G06F 11/366 711/163 |
| 2010/0153693 | A1* | 6/2010 | Stall .................. G06F 9/30189 712/229 |

OTHER PUBLICATIONS

".NET Micro Framework", Retrieved from: https://web.archive.org/web/20081013145937/https://www.microsoft.com/netmf/default.mspx, Retrieved Date: Oct. 13, 2008, 01 Page.

"ARM RealView Development Suite", Retrieved from: http://www.arm.com/products/tools/software-tools/index.php, Retrieved Date: Oct. 21, 2010, 30 Pages.

"ARM Security Technology, Building a Secure System using TrustZone Technology", Retrieved from http://webcache.googleusercontent.com/search?q=cache:OcfSXqyZ7XgJ:infocenter.arm.com/help/topic/com.arm.doc.prd29-genc-009492c/PRD29-GENC-009492C_trustzone_security_whitepaper.pdf+&cd=1&hl=en&ct=clnk&gl=in, Jan. 2009, 108 Pages.

"Porting the .NET Micro Framework.", Retrieved from: https://web.archive.org/web/20090322080443/http://msdn.microsoft.com/en-us/netframework/bb267253.aspx, Retrieved Date: Mar. 22, 2009, 02 Pages.

"SAgent: A Security Framework for JADE", In Proceedings of the fifth international joint conference on Autonomous agents and multiagent systems, May 8, 2006, 17 Pages.

"Transaction authentication number", Retrieved from: https://web.archive.org/web/20100901101909/http://en.wikipedia.org:80/wiki/Transaction_authentication_number, Retrieved Date: Sep. 1, 2010, 03 Pages.

"Trusted platform module specification", In Publication of Trusted Computing Group, Version 1.2, Level 2, Revision 103, Jul. 9, 2007, 710 Pages.

Bickford, et al., "Rootkits on Smart Phones: Attacks, Implications and Opportunities", In Proceedings of the Eleventh Workshop on Mobile Computing Systems & Applications, Feb. 22, 2010, pp. 49-54.

Brumley, et al., "Privtrans: automatically partitioning programs for privilege separation", In Proceedings of the 13th conference on USENIX Security Symposium—vol. 13, Aug. 9, 2004, 15 Pages.

Chong, et al., "Secure Web Applications via Automatic Partitioning", In Proceedings of Twenty-First ACM SIGOPS Symposium on Operating Systems Principles, Oct. 14, 2007, pp. 31-44.

Enck, et al., "TaintDroid: An Information-Flow Tracking System for Realtime Privacy Monitoring on Smartphones", In Proceedings of the 9th USENIX conference on Operating systems design and implementation, Oct. 4, 2010, pp. 393-407.

Garfinkel, et al., "Terra: A Virtual Machine-Based Platform for Trusted Computing", In Proceedings of the Nineteenth ACM Symposium on Operating Systems Principles, Oct. 19, 2003, pp. 193-206.

Garrigues, et al., "Promoting the development of secure mobile agent applications", Retrieved from: http://openaccess.uoc.edu/webapps/o2/bitstream/10609/5186/1/main.pdf, Nov. 5, 2010, 27 Pages.

Hypponen, Mikko, "Malware goes Mobile", In Publication of Scientific American, Nov. 2006, 08 Pages.

Iqbal, et al., "An Overview of Microkernel, Hypervisor and Microvisor Virtualization Approaches for Embedded Systems", In Report of Department of Electrical and Information Technology, Lund University, Jan. 2009, 15 Pages.

McCune, et al., "Flicker: An Execution Infrastructure for TCB Minimization", In Proceedings of the 3rd ACM SIGOPS/EuroSys European Conference on Computer Systems, vol. 42, Issue 4, Apr. 1, 2008, pp. 315-328.

McCune, et al., "TrustVisor: Efficient TCB Reduction and Attestation", In Symposium on Security and Privacy, May 16, 2010, pp. 143-158.

Myers, C. Andrew., "JFlow Practical Mostly-Static Information Flow Control", In Proceedings of the 26th ACM SIGPLAN-SIGACT symposium on Principles of programming languages, Jan. 20, 1999, pp. 228-241.

Patel, et al. "A Platform for Device and Computation Management", In Journal of Transactions on Circuits and Systems, vol. 4, Issue 11, Oct. 27, 2005, pp. 1742-1751.

Serhani, et al., "Toward an Efficient Framework for Designing, Developing, and Using Secure Mobile Applications", In Proceedings of International Conference on Software and Data Engineering, Apr. 23, 2009, pp. 256-262.

Winter, Johannes, "Trusted Computing Building Blocks for Embedded Linux-Based Arm Trustzone Platforms", In Proceedings of the 3rd ACM Workshop on ScalableTrusted Computing, Oct. 31, 2008, pp. 21-30.

\* cited by examiner

TRUSTED LANGUAGE RUNTIME ON A MOBILE PLATFORM

BACKGROUND

Mobile systems, such as smartphones, lack support for building and running secure and trusted applications without including a large amount of code in the application's trusted computing base, such as a complete operating system and a managed language runtime. Solutions designed for traditional desktop or server machines using virtualization technology are excessively heavyweight for mobile systems. Moreover, hardware-based solutions provide a low-level interface that makes the solutions inordinately difficult to program.

Existing approaches to providing secure and trusted runtime environments do not meet the needs of today's mobile landscape for multiple reasons. In one example, the majority of mobile handhelds are ARM-based (a processor dedicated for security), and hence, cannot directly utilize x86-based solutions. Additionally, unlike desktops, mobile devices are oftentimes resource constrained. A system for running trusted applications on a smartphone needs to be lightweight. While previous hypervisor-based solutions offer isolation from malicious code, such solutions are too heavyweight for a smartphone when considering the impact on memory use, performance, and energy consumption. Finally, the popularity of smartphones has resulted in a large number of developers developing a highly diverse set of mobile applications. Any system that offers trusted computing primitives to such a large number of third-party developers with varying skills and backgrounds needs to offer easy-to-use, rich programming abstractions.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a trusted language runtime (TLR) architecture that provides abstractions for developing a runtime for executing trusted applications or portions thereof securely on a mobile device (e.g., a smartphone). A trusted execution environment is created in the mobile device using hardware processor-based isolation extensions. TLR offers at least two abstractions to mobile developers: a trustbox and a trustlet. The trustbox is a runtime environment that offers code and data integrity, and confidentiality. Code and data running inside trustbox cannot be read or modified by any code running outside the trustbox. A trustlet is the portion of an application that runs inside a trustbox. A trustlet can be a .NET-based class whose interface defines the data that can flow in or out of the trustbox.

With TLR, programmers can write applications in .NET and specify which parts of the application handle sensitive data, and thus, run inside the trustbox. With the TLR, the developer places these parts in a trustlet class, and the TLR provides all support needed to run the parts in a trustbox. By splitting an application into a small trusted component (a trustlet) and a large untrusted component, the application's attack surface is reduced. Any exploitable bug in the untrusted component does not affect the trusted component's integrity and confidentiality.

The TLR can utilize the ARM TrustZone™ memory protection and interrupt delivery control mechanisms, thus reducing the size of its trusted computing base (TCB). TLR also uses the ARM TrustZone hardware support that provides underlying trusted computing primitives with a small TCB, and that yet does not include the operating system.

Additionally, TLR can utilize a .NET MicroFramework™ (by Microsoft Corporation) (or other suitable development and execution environment), which is a language runtime for embedded and resource-constrained device that offers the productivity benefits of modern high-level languages to application developers.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
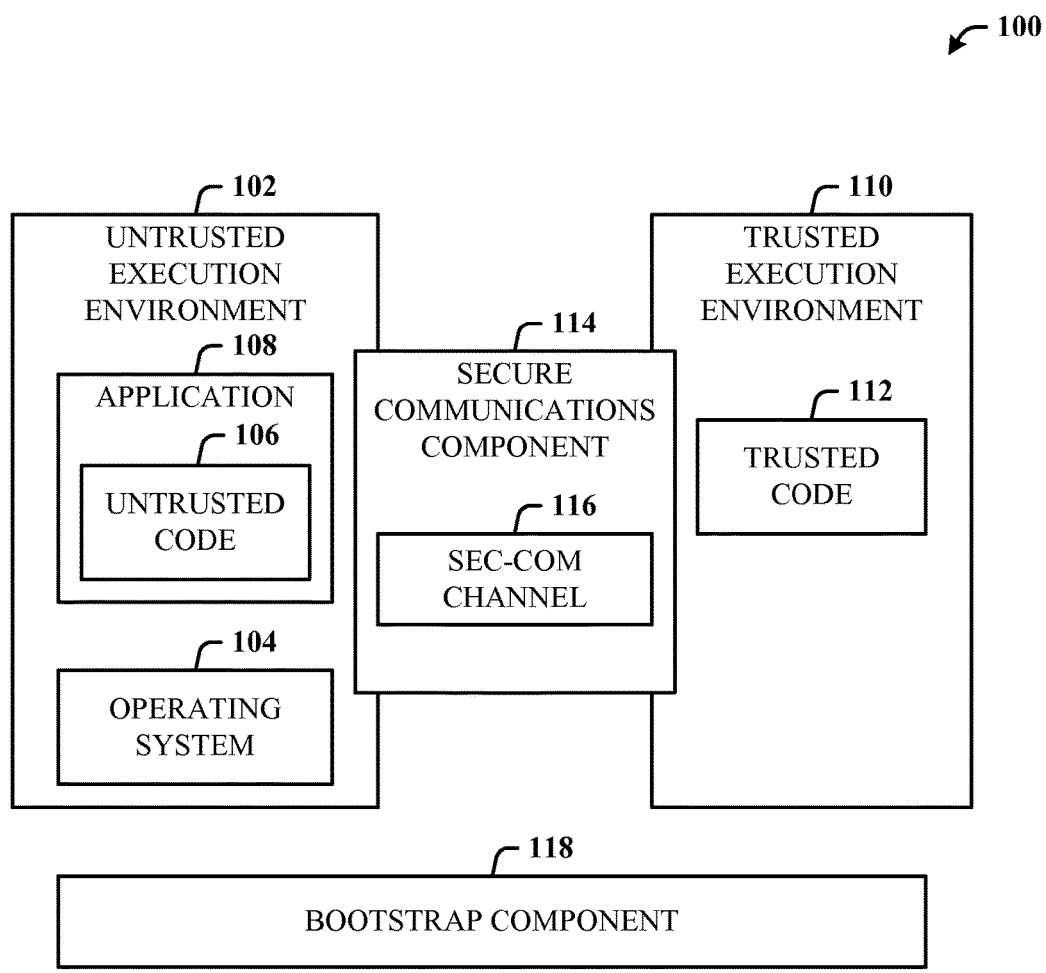
FIG. 1 illustrates an execution system in accordance with the disclosed architecture.

The disclosed trusted language runtime (TLR) architecture provides abstractions for developing a runtime for running secure and trusted applications on a platform, such as a smartphone. The TLR can utilize ARM TrustZone hardware support, for example, that provides underlying trusted computing primitives with a small trusted computing base (TCB) that does not include the device operating system (OS). Further, TLR can utilize a language runtime for embedded and resource-constrained device that offers the productivity benefits of modern high-level languages to application developers (e.g., the .NET Micro Framework).

This allows applications to be built with modern programming languages, such as C#, that improve programmer productivity through features such as strong type checking and garbage collection. Where the .NET Micro Framework is employed, the .NET Framework is a much smaller version of the standard .NET framework, and is specifically designed for resource constrained devices. In addition to its smaller codebase, the .NET Micro Framework implements the minimal system support code needed to run directly on the hardware inside the trusted environment without including the OS as part of the TCB.

The TCB of the trusted environment is further reduced by eliminating all support for I/O (input-output). This greatly reduces the size of the class libraries. For example, the GUI (graphical user interface) libraries which typically compose a large portion of the class libraries needed by applications are no longer needed. Moreover, eliminating support for I/O also eliminates the need for I/O device drivers, which drivers typically constitute the largest fraction of the TCB in modern operating systems.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an execution system 100 in accordance with the disclosed architecture. The system 100 includes an untrusted execution environment 102 (e.g., of a mobile device) where an operating system 104 and untrusted code 106 of an application 108 execute. The system 100 also includes a trusted execution environment 110 (e.g., of the mobile device) where trusted code 112 of the application 108 executes. The trusted code 112 is isolated from inspection and modification by the untrusted code 106.

A secure communications component 114 (e.g., of the mobile device) provides a secure communications (denoted SEC-COM) channel 116 between the trusted execution environment 110 and untrusted execution environment 102. The secure communications component 114 encrypts data and binds the encrypted data to a specific set of trusted code in the trusted execution environment 110, which environment 110 can include multiples sets of trusted code. The secure communications component 114 switches between a secure mode and an unsecure mode. The secure communications component 114 saves and restores processor state of the trusted and untrusted execution environments (110 and 102) based on mode.

The secure communications component 114 establishes the secure communications channel 116 in response to a call, the channel 116 based on kernel-mode drivers, one of which initiates a secure mode. The secure communications component 114 establishes the secure communications channel 116 based on libraries at a language runtime level of the trusted and untrusted execution environments (110 and 102), and communications drivers at a system support level of the trusted and untrusted execution environments (110 and 102).

The trusted code 112 is identified in the application 108 according to a class that defines data which flows between the trusted execution environment 110 and the untrusted execution environment 102. In one embodiment, the trusted execution environment 110 is absent of input-output interfaces and device drivers. In another embodiment, the trusted execution environment 110 can utilize input-output interfaces and device drivers. The trusted execution environment 110 executes according to a language runtime environment that runs using hardware-based isolation protection extensions.

The system 100 further comprises a bootstrap component 118 that first boots the mobile device into a secure mode and runs a secure bootloader to establish the trusted execution environment 110, and thereafter, invokes an untrusted bootloader to execute a standard boot sequence for the operating system 104.

To build a trusted mobile application with the TLR, the developer typically determines which part of an application handles sensitive data, seals the sensitive data by binding it to the trustlet, and deploys trustlet and sealed data to the platform (e.g., smartphone) and runs the trustlet and data inside of a trustbox.

To define a trustlet, the developer identifies the application's sensitive data, and separates the program logic that needs to operate on this data, into the trustlet. The public interface to the trustlet's main class is defined, as this interface controls the data that crosses the boundary between the trusted and untrusted environments. A trustlet may use many helper classes, and may even comprise multiple assemblies, yet there is only one class that defines the trustlet's boundary. Once all classes are compiled into assemblies, the developer runs a TLR post-compilation tool for creating a package that contains the closure of the assemblies, and a manifest.

With respect to sealing the sensitive data by binding the data to the trustlet, although any application developer can encrypt data without the help of the TLR, the TLR provides special encryption primitives called seal and unseal. These operations allow a developer to encrypt (seal) an object such that it can only be decrypted (unsealed) on a specific platform, by a specific trustlet.

Both the platform and trustlet identities can be specified at seal time: a unique public/private key pair for the platform, and a secure hash (e.g., SHA-1) of the trustlet assemblies. To recover sealed data, the TLR decrypts the sealed data using the platform key, and checks that the hash of the trustlet requesting to unseal the data matches the hash of the trustlet that originally sealed the data. This mechanism enables the application to store trustlet data across multiple sessions in persistent storage, and it allows external parties (e.g., a trusted service) to ensure that sealed data can only be accessed on platforms it trusts.

To ensure that the trustlet state is protected at runtime, the developer instantiates a trustbox by providing the trustlet's manifest. At this point, the TLR loads the trustlet's assemblies and creates an instance of the trustlet main class. The resulting object constitutes the runtime state of the trustlet until the application destroys the trustbox. To allow the application to interact with the trustlet, the application requests that the TLR create an entrypoint object, which is a transparent proxy to the trustlet interface. Whenever the application invokes methods on the entrypoint, the TLR transparently forwards these calls to the trustlet main object.

One common primitive used to build trusted applications is "remote attestation": the ability of a computer to attest its own software configuration to a remote party. In one implementation, a remote attestation mechanism is employed. In an alternative implementation, remote attestation is omitted to reduce the overall system complexity. TLR finds particular applicability to smartphones. In one usage model, smartphone manufacturers initialize and ship devices with a trusted (uncompromised) TLR implementation. The manufacturer signs this TLR configuration, and the boot process performs signature verification. As long as the TLR implementation is not compromised, it then protects the integrity and confidentiality of data and code running in a trustbox. With this model, the TLR offers adequate trust properties even without remote attestation.

Figure 2:
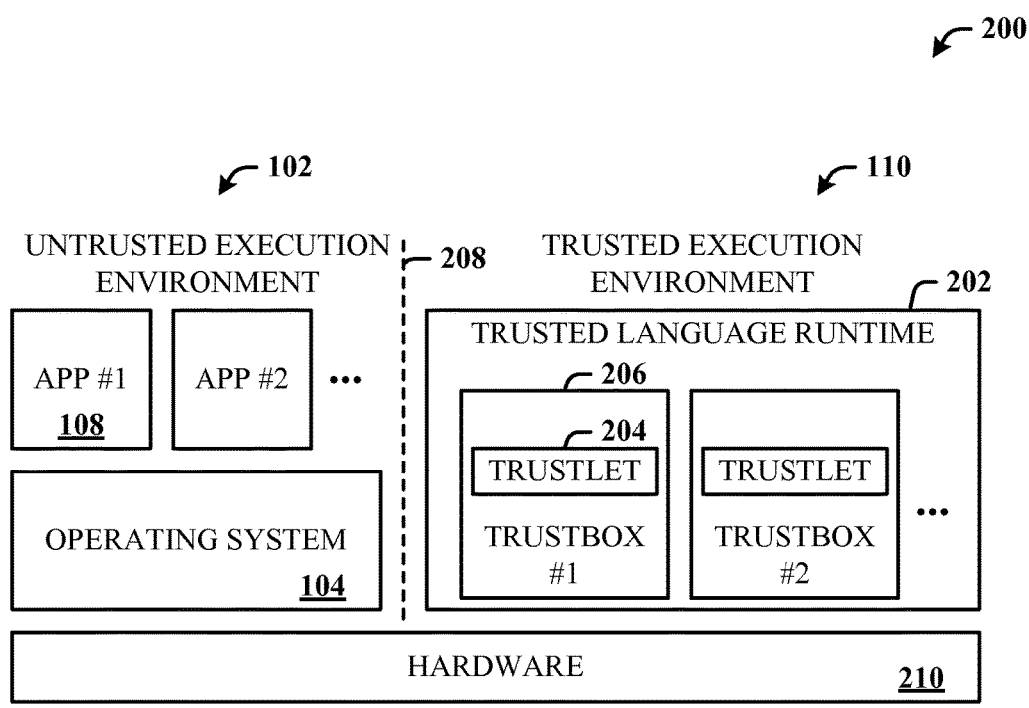
FIG. 2 illustrates a high-level architecture of the trusted language runtime.

FIG. 2 illustrates a high-level architecture 200 of the trusted language runtime 202. The architecture 200 provides two execution environments: the untrusted execution environment 102 (where the mobile device OS and most application software runs) and the trusted execution environment 110. The code running in the trusted environment 110 is isolated from any code running in the untrusted environment 102. Untrusted code (e.g., in application 108) cannot inspect or modify the trusted code (e.g., in a first trustlet 204 of a first trustbox 206). To enable interaction, the TLR 202 provides a secure communication channel between the two environments (102 and 110). The TLR 202 ensures both integrity and confidentiality for code and data inside the trusted environment 110.

The trusted environment 110 offers a language runtime with minimal library support (e.g., .NET Micro Framework™ by Microsoft Corporation). A resource-constrained runtime environment offers flexibility to accommodate the trusted computing needs of mobile applications while keeping the TCB of the TLR 202 small. With the TLR 202, a developer partitions a mobile application (e.g., application 108) into components (e.g., two): a small-sized trusted component (e.g., the first trustlet 204) that can run on the resource-constrained runtime 202 of the trusted environment 110, and a large-sized untrusted component (e.g., untrusted code 106) that implements most of the application's functionality.

Four primitives are described in the design of the TLR 202. The trustbox 206 is an isolation environment that protects the integrity and confidentiality of any code running inside, as well as its state. The OS 104 (and/or any untrusted application code) can neither tamper with the trusted code running in the trustbox 206 nor inspect state of the trusted code.

The trustlet 204 is a class within an application that runs inside a trustbox. The trustlet 204 specifies an interface that defines the data that can cross a boundary 208 between the trustbox 206 and the untrusted environment 102. The runtime's use of strong types ensures that the data crossing the boundary 208 is clearly defined.

With respect to platform (device) identity, each device that supports the TLR 202 provides a cryptographic platform identity (e.g., unique). This identity is used to authenticate the platform and to protect (using encryption) any trusted application and data deployed to the platform. In one implementation, a public/private key pair is employed. Access to the private key is provided solely to the TLR 202, which never reveals the private key.

The seal and unseal of data are abstractions that serve two roles: a trustlet can persist state across reboots, and a remote trusted party (e.g., a trusted server) can communicate with a trustlet securely. Sealing data is defined as data that is encrypted and bound to a particular trustlet and platform before being released to the untrusted environment 102. The TLR 202 unseals data only to the same trustlet (e.g., trustlet 204) on the same platform that originally sealed it. The trustlet's identity can be based on a secure hash of its code. As depicted in FIG. 2, the TLR 202 operates directly from the hardware 210 of the platform (e.g., mobile device).

Figure 3:
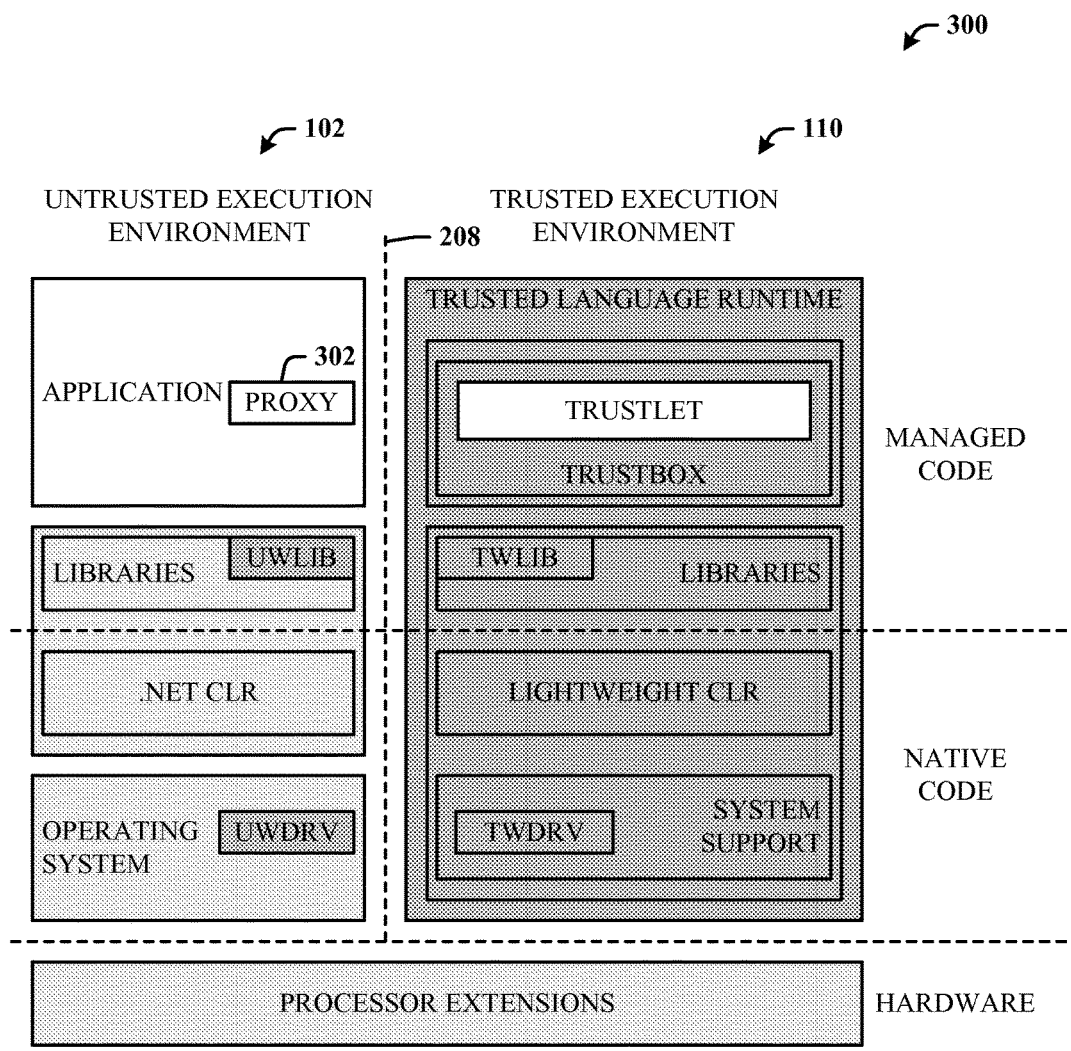
FIG. 3 illustrates a detailed view of trusted language runtime components.

FIG. 3 illustrates a detailed view 300 of TLR components. The darkest shade shows the TLR components, the light shading shows the device standard system components, and the application components are in white. As previously described, to enable communication between the untrusted and trusted worlds, a secure procedure call (SPC) mechanism (e.g., secure communications component 114 of FIG. 1) is provided. Four components implement this capability: an untrusted environment library (denoted the UWLib) and a trusted environment library (denoted TWLib), both at the language runtime (or managed code) level, and an untrusted environment communication driver (denoted UWDrv) and a trusted environment communication driver (denoted TWDrv), both at the system support (native code) level. The drivers implement context switching in and out of secure mode, and the library components hand off the appropriate input and output data to the drivers.

To enable application partitioning, the TLR implements the trustlet and trustbox classes. The trustlet defines the self-contained application code which is to be run inside the isolated trustbox. To build an application that uses the TLR, at a minimum the programmer implements 1) the main trustlet class that defines the public interface between the trusted and untrusted environments (110 and 102), and 2) the code that manages the lifetime of the trustbox.

To implement the trustlet main class, a new class is defined that inherits from the Trustlet class and that implements an IEntrypoint interface. Any public method defined in this class enables data to cross the barrier (boundary 208) between the trusted and untrusted environments (110 and 102). All Trustlet objects also provide two methods, Init and Finish, which are called when the trustbox is created and destroyed, respectively. These methods can be overridden to perform any application specific operations during these events. The use of a strongly typed runtime ensures that it is simple to reason about the kinds of data crossing this barrier, so that the sensitive data protected by the trustbox does not leak into the untrusted environment 102.

To manage the lifetime of a trustbox, the TLR provides three methods implemented by the Trustbox class. To create a trustbox, an application invokes a Create method, which takes as input the trustlet manifest, and creates a new trustbox dedicated to hosting the trustlet. The trustbox reference returned by Create can then be used by the application to obtain a transparent proxy 302 to the trustlet entrypoint, by calling the Entrypoint method. The transparent proxy 302 is used to ensure that all calls into the trustlet are routed through the SPC mechanism. Finally, when the application wishes to terminate, it invokes a Destroy method to clean up the runtime state of the trustlet.

Finally, the TLR provides Seal and Unseal operations. Sealing is a form of encryption that binds the encrypted data to a specific trustlet running on a specific system. To accomplish this, each unique device (e.g., smartphone) has a public/private key pair referred to as the platform ID. The platform ID is used in combination with a secure hash of the trustlet codebase to identify a particular instance of a trustlet. Seal takes three inputs: 1) the object to be sealed, 2) the public key of the target platform ID, and 3) a secure hash of the target trustlet. Seal returns an envelope which comprises of the serialized object concatenated with the trusted hash value, encrypted using the platform ID public key. Unseal decrypts the envelope (which can only be done using with the platform ID private key), and then returns the original data only if the currently running trustlet hash value matches the envelope hash value. As a result, unseal ensures the trustlet identity and integrity.

Following is a sample application to illustrate how these constructs work together. To improve security, banking services typically rely on multiple mechanisms for authenticating customers during online transactions. In addition to the customer password, banks normally issue a list of Transaction Authentication Numbers (TANs), each of which constitutes a one-time password for authorizing a bank transfer. The bank sends a list of TANs to each customer, and whenever the customer performs an online transfer, the bank specifies an index into the TAN list and asks for the TAN associated with that index. Today, banks usually record the TAN list on a plastic card, and send that card to the customer over an out-of-band channel (e.g., physical mail).

Banks can take advantage of the TLR to build an application that can protect the confidentiality of the TAN list when stored on a customer's smartphone. To accomplish this, the bank create a trustlet (code that is trusted by the bank), and seals the TAN list on a per-customer basis so that the list can only be unsealed by the bank's trustlet running on that specific customer's phone. The code running within the trustlet can access the TAN list, retrieve the appropriate TAN number, and pass it to the untrusted environment to be sent to the remote bank server. The trustlet and the remote server communicate using SSL (secure socket layer) to protect the confidentiality of the data while in flight.

Following is an implementation of a trustlet for the above example.

```
public interface ITanWallet : IEntrypoint
{
    public void Load(Envelope tanLst);
    public Tan GetTan(long id);
}
public class TanWallet: ITanWallet, Trustlet
{
    private TanList __tanLst = null;
    public override void Init( ) { }
    public void Load(Envelope tanLst) {
        try {
            __tanLst = (TanList) this.Unseal(tanLst);
        } catch(Exception e) {
            throw new Exception("Cannot recover TAN list.");
        }
    }
    public Tan GetTan(long id) {
        Tan tan = __tanLst.Search(id);
        if (tan == null) {
            throw new Exception("TAN id invalid.");
        } else {
            return tan;
        }
    }
    public override void Finish( ) { }
}
```

The following code illustrates the calling services on a trustbox.

```
// setup the TAN wallet trustlet in a trustbox
Trustbox tbox = Trustbox.Create("TanWallet.manifest");
// obtain a reference to the trustbox entrypoint
ITanWallet twallet = (ITanWallet) tbox.Entrypoint( );
// load the TAN list issued and sealed by the bank
twallet.Load(myTanLst);
// run online transaction with the bank
// obtain a TAN with id requested by the bank
Tan tan = twallet.GetTan(id);
```

The following code illustrates the trusted service sending confidential data to a trustlet.

```
// the bank generates a TAN list for the customer
TanList newLst = customer.GenTanLst( );
// seal the list
Envelope sealedLst = Trustlet.Seal(customer.PlatformID( ),
Trustlet.Hash("TanWallet.manifest"), newLst);
// send the sealed list to the customer
```

Following is a description of the runtime operation. When the hardware processor (e.g., an ARM processor) supports security extensions (e.g., TrustZone), at boot time, the processor starts in secure mode and runs the secure bootloader. A secure bootloader loads the TLR image into memory and checks the image integrity. Based on hardware support for memory isolation, the TLR runtime lives in the address space of the trusted environment, and therefore, cannot be accessed from the untrusted environment. Next, the secure bootloader hands off to the initialization code within the TLR runtime. After the TLR initialization code finishes, a mode switch instruction is used to exit secure mode, at which point the untrusted environment bootloader is invoked. The standard OS boot sequence is then executed.

The TLR provides the SPC, which enables a secure communication channel between the trusted and untrusted environments. To enable switching between the trusted and untrusted environments, the UWDry and TWDry drivers use the processor secure extension instructions that enable switching in and out of secure mode.

When the UWDry receives an SPC request, the driver executes the smc instruction, which raises a processor exception. This exception causes the processor to enter a privileged mode called monitor mode, and then jumps to the appropriate exception handler which is implemented by the TWDry driver. This handler implements the context switch by storing the processor state from the untrusted world, and restoring the trusted world processor state. The processor then leaves monitor mode, and the TWDry forwards the request up to the trusted environment library (TWLib), which calls a managed code handler to service the SPC request. When this handler finishes, the system returns to the untrusted environment using the same mechanism. The drivers are also responsible for marshaling the arguments and return values.

With respect to trustbox creation and termination, when the application requests the creation of a trustbox, the TLR performs the following steps: 1) computes the hash of the trustlet assemblies specified by the manifest, 2) creates a new sandboxed environment inside the trusted environment (e.g., using a .NET AppDomain container, which is how multiple trustlets that live in the trusted environment can be isolated from each other), 3) loads the trustlet assemblies into the container, and 4) creates an instance of the trustlet's main class. After these operations succeed, the TLR provides a reference to the trustbox as the return value of the SPC. This reference can be used for future interactions with the trustbox.

When the application calls the Entrypoint method on the trustbox reference, the untrusted world library (UWLib) creates the transparent proxy and returns it to the untrusted part of the application. After this step, whenever the untrusted application invokes a method on the proxy, the UWLib forwards this invocation to the appropriate trustlet inside the trustbox, using the SPC mechanism described herein. This invocation is fully transparent to the application, and the object state is preserved across these calls. To destroy a trustbox, the TLR runtime deletes the container of the trustbox, thereby freeing all its resources and discarding its internal state. If the developer wants to save any state persistently across instances, a trustlet method can be implemented to seal the relevant state, and have the application store the sealed relevant state persistently.

Figure 4:
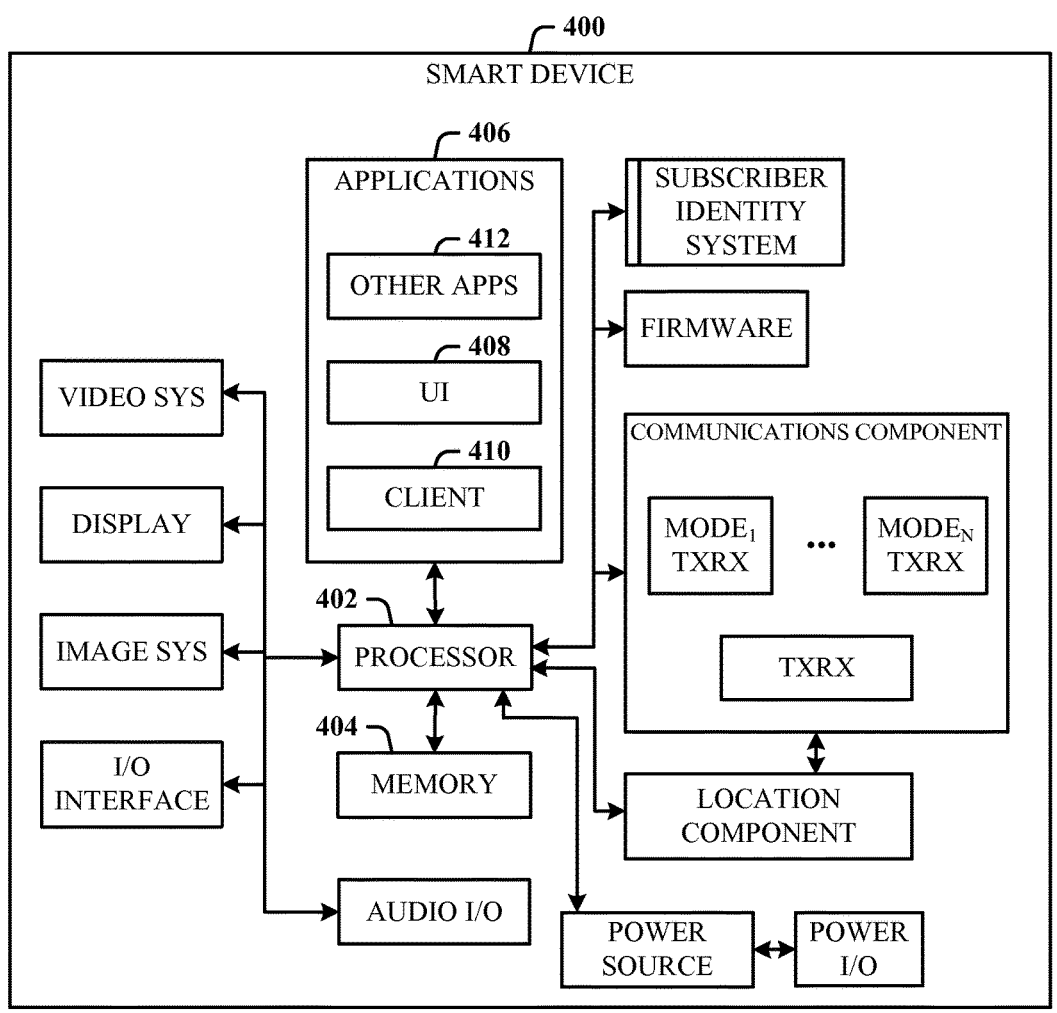
FIG. 4 illustrates a schematic block diagram of an exemplary smart mobile device that a host the trusted language runtime architecture in accordance with the disclosed architecture.

FIG. 4 illustrates a schematic block diagram of an exemplary smart mobile device 400 configured to host the trusted language runtime architecture in accordance with the disclosed architecture. In order to provide additional context for various aspects thereof, FIG. 4 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The smart device 400 (e.g., a cell phone, PDA) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The smart device 400 includes a processor 402 (e.g., ARM) for controlling and processing onboard operations and functions. A memory 404 interfaces to the processor 402 for the storage of data and one or more applications 406 (e.g., a video player software, user feedback component software, etc.).

The applications 406 can include an untrusted application having portions thereof designated as trustlets for secure execution in the trusted execution environment(s).

The applications 406 can also include a user interface (UI) application 408 that operates with a client 410 (e.g., operating system) to facilitate user interaction with handset functionality and data, for example, answering/initiating calls, entering/deleting data, configuring settings, address book manipulation, multimode interaction, etc. The applications 406 can include other applications 412 that came installed with the device 400 and/or can be installed as add-ons or plug-ins to the client 410 and/or UI 408, for example, or for other purposes (e.g., processor, firmware, etc.).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
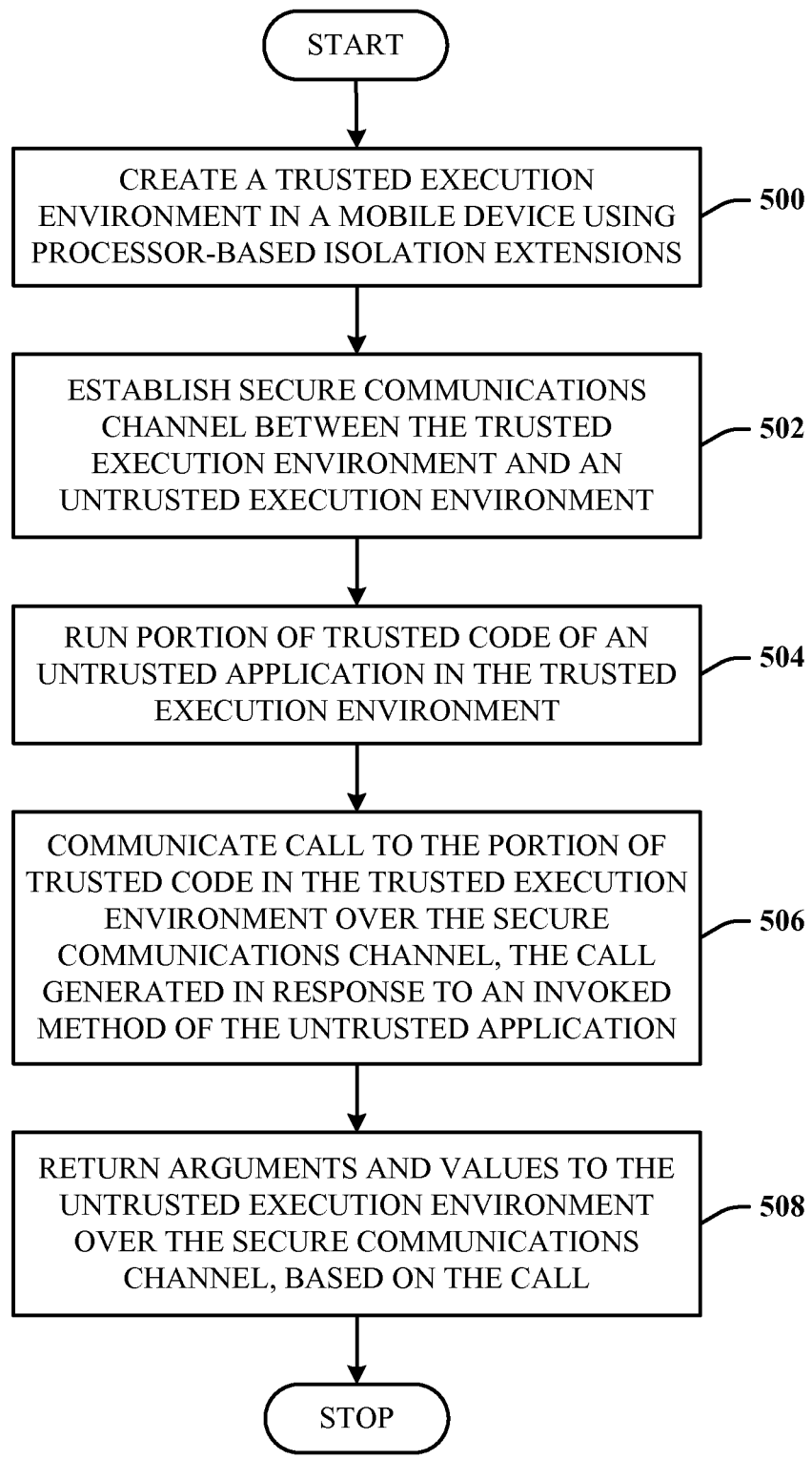
FIG. 5 illustrates a computer-implemented execution method in accordance with the disclosed architecture.

FIG. 5 illustrates a computer-implemented execution method in accordance with the disclosed architecture. At 500 a trusted execution environment is created in a mobile device using processor-based isolation extensions. At 502, a secure communications channel is establish between the trusted execution environment and an untrusted execution environment. At 504, a portion of trusted code of an untrusted application is run in the trusted execution environment. At 506, a call to the portion of trusted code in the trusted execution environment is communicated over the secure communications channel. The call can be generated in response to an invoked method of the untrusted application. At 508, arguments and values are returned to the untrusted execution environment over the secure communications channel, based on the call.

Figure 6:
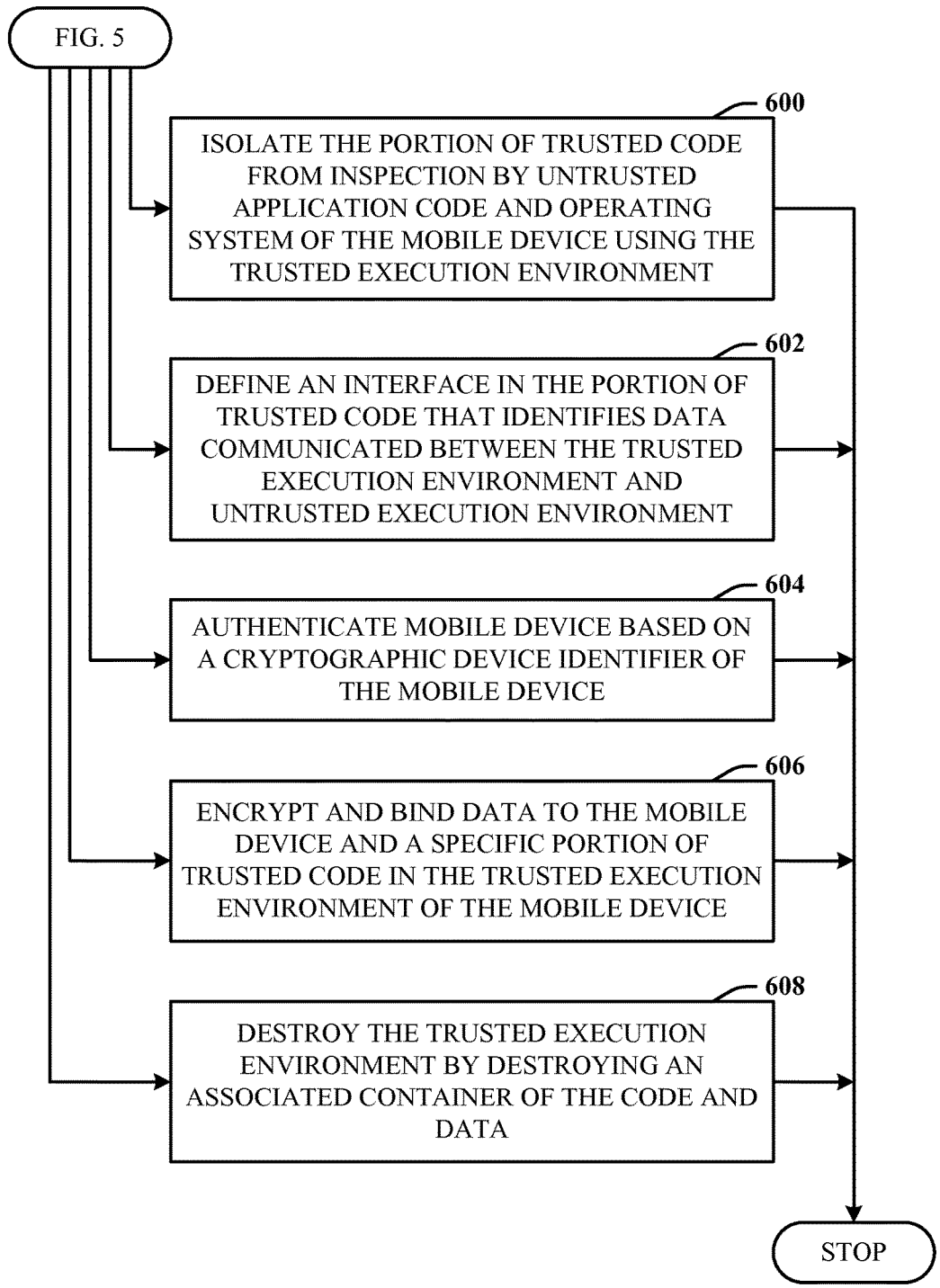
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the portion of trusted code is isolated from inspection by untrusted application code and operating system of the mobile device using the trusted execution environment. At 602, an interface is defined in the portion of trusted code that identifies data communicated between the trusted execution environment and untrusted execution environment. At 604, the mobile device is authenticated based on a cryptographic device identifier of the mobile device. At 606, data is encrypted and bound to the mobile device and a specific portion of trusted code in the trusted execution environment of the mobile device. At 608, the trusted execution environment is destroyed by destroying an associated container of the code and data.

Figure 7:
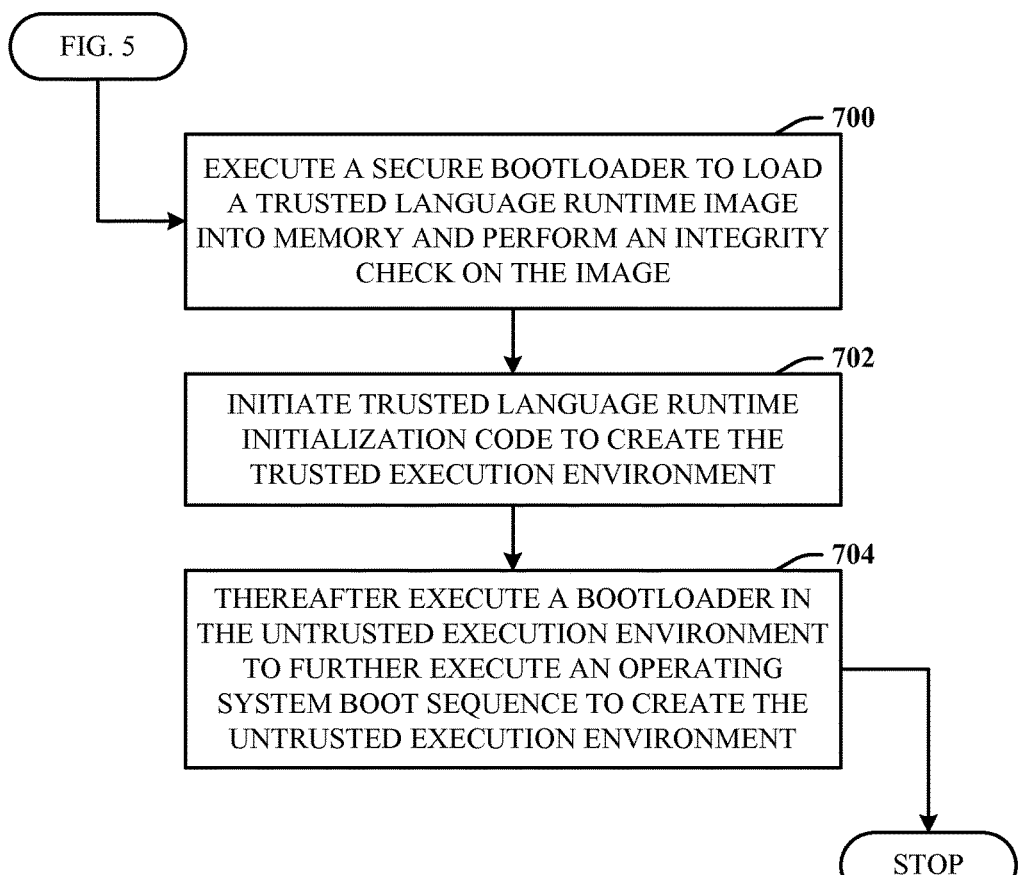
FIG. 7 illustrates further aspects of the method of FIG. 5.

FIG. 7 illustrates further aspects of the method of FIG. 5. Note that the flow indicates that each block can represent a step that can be included, separately or in combination with other blocks, as additional aspects of the method represented by the flow chart of FIG. 5. At 700, a secure bootloader is executed to load a trusted language runtime image into memory and perform an integrity check on the image. At 702, trusted language runtime initialization code is initialized to create the trusted execution environment. At 704, a bootloader is thereafter executed in the untrusted execution environment to further execute an operating system boot sequence to create the untrusted execution environment.

Figure 8:
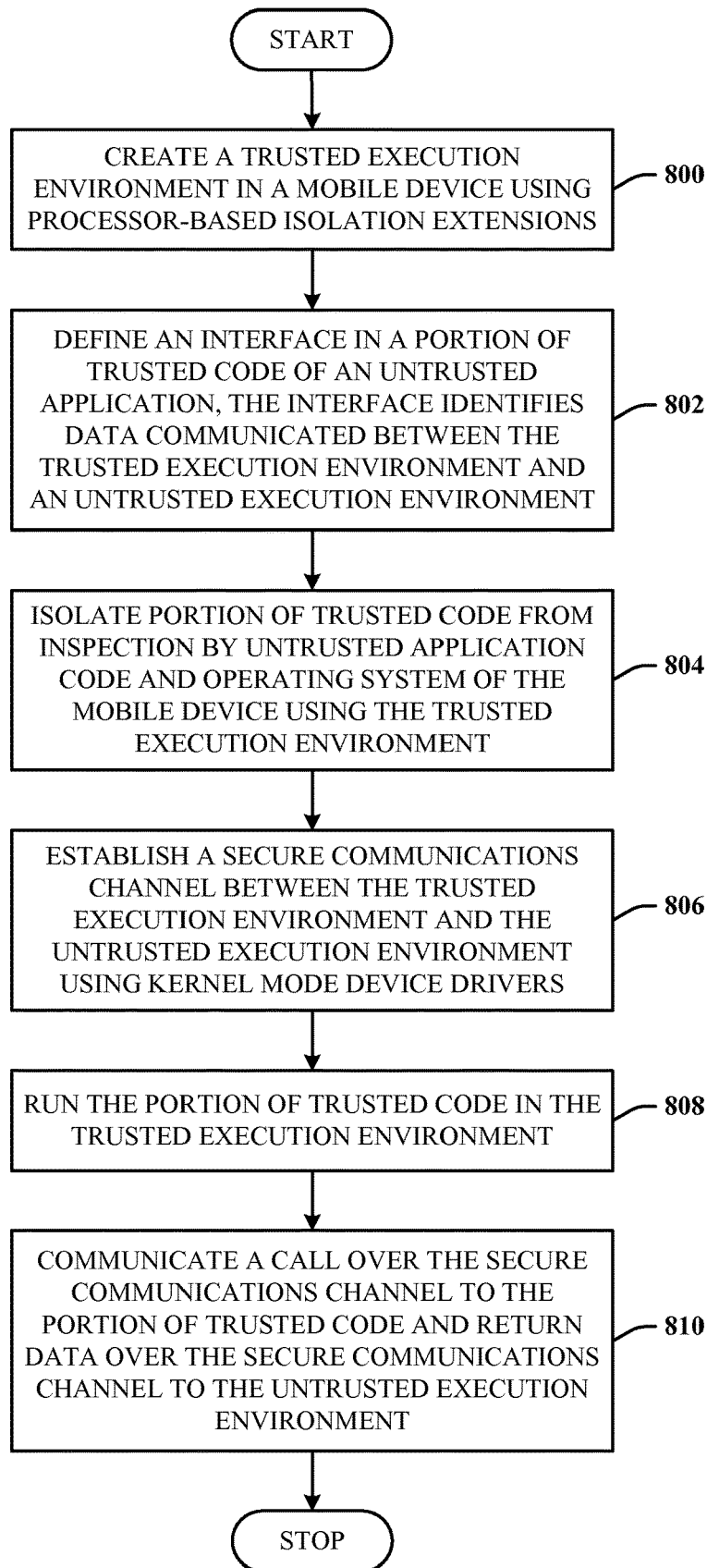
FIG. 8 illustrates an alternative execution method in accordance with the disclosed architecture.

FIG. 8 illustrates an alternative execution method in accordance with the disclosed architecture. At 800, a trusted execution environment is created in a mobile device using processor-based isolation extensions. At 802, an interface is defined in a portion of trusted code of an untrusted application, the interface identifies data communicated between the trusted execution environment and an untrusted execution environment. At 804, the portion of trusted code is isolated from inspection by untrusted application code and operating system of the mobile device using the trusted execution environment. At 806, a secure communications channel is established between the trusted execution environment and the untrusted execution environment using kernel mode device drivers. At 808, the portion of trusted code is run in the trusted execution environment. At 810, a call is communicated over the secure communications channel to the portion of trusted code and data returned over the secure communications channel to the untrusted execution environment.

Figure 9:
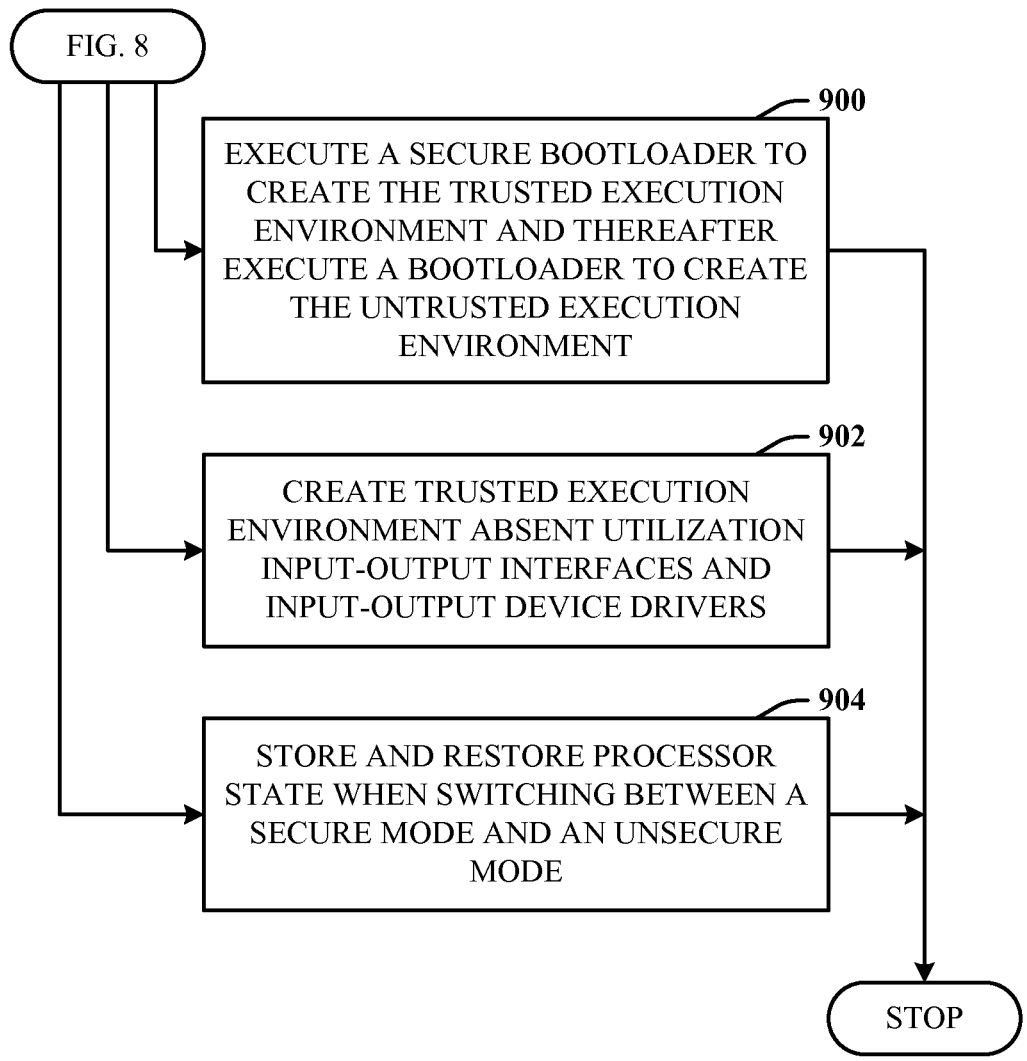
FIG. 9 illustrates further aspects of the method of FIG. 8.

FIG. 9 illustrates further aspects of the method of FIG. 8. Note that the flow indicates that each block can represent a step that can be included, separately or in combination with other blocks, as additional aspects of the method represented by the flow chart of FIG. 8. At 900, a secure bootloader is executed to create the trusted execution environment and thereafter a bootloader is executed to create the untrusted execution environment. At 902, the trusted execution environment is created absent utilization input-output interfaces and input-output device drivers. As previously described, however, input-output interfaces and input-output device drivers can be utilized in the trusted execution environment. At 904, processor state is stored and restored when switching between a secure mode and an unsecure mode.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
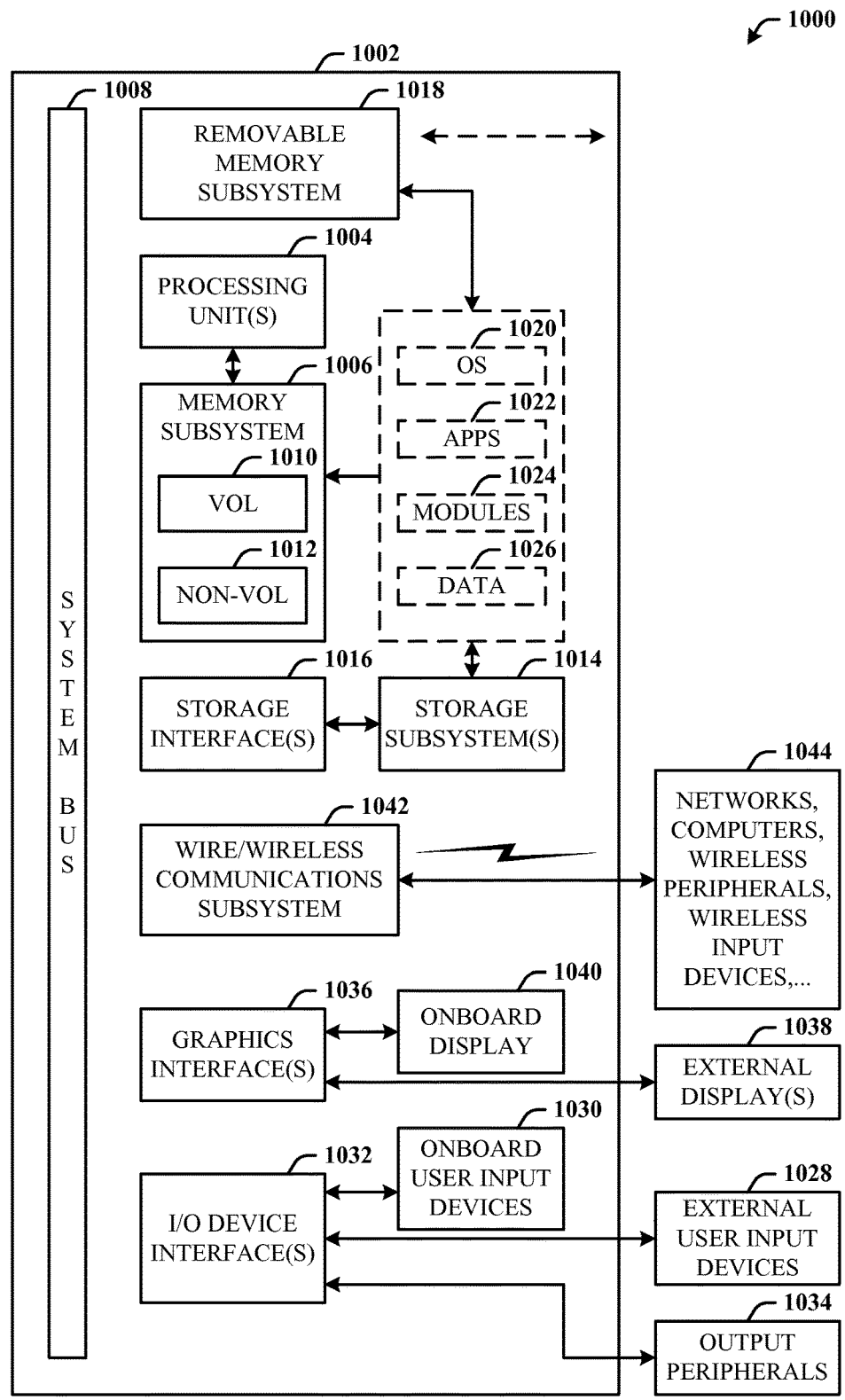
FIG. 10 illustrates a block diagram of a computing system that executes the trusted language runtime architecture.

Referring now to FIG. 10, there is illustrated a block diagram of a computing system 1000 that executes the trusted language runtime architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multiprocessor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include entities and components of the system 100 of FIG. 1, entities and components of the architecture 200 of FIG. 2, entities and components of the view 300 of FIG. 3, and the methods represented by the flowcharts of FIGS. 5-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented execution system, comprising:
    an untrusted execution environment of a mobile device where an operating system and untrusted code of an application execute;
    a trusted execution environment of the mobile device where trusted code of the application executes, wherein the trusted code, data and execution of the trusted code in the trusted execution environment are inaccessible from inspection and modification by the execution of the untrusted code in the untrusted execution environment, the trusted code defining an interface that identifies data communicated between the trusted execution environment and the untrusted execution environment;
    a secure communications component of the mobile device that provides a secure communications channel between the trusted code executing in the trusted execution environment and the untrusted code executing in the untrusted execution environment;
    a runtime component of the mobile device that identifies the trusted code of the application and enables the trusted code of the application to be executed in the trusted execution environment; and
    a processor that executes computer-executable instructions of the untrusted code of the application within the untrusted execution environment and the trusted code of the application within the trusted execution environment.

2. The system of claim 1, wherein the trusted execution environment is absent of an operating system.

3. The system of claim 1, wherein the trusted execution environment is absent of input-output interfaces and device drivers.

4. The system of claim 1, wherein the trusted execution environment executes according to a language runtime environment that runs using hardware-based isolation protection extensions.

5. The system of claim 1, wherein the secure communications component encrypts data and binds the encrypted data to a specific set of trusted code in the trusted execution environment, which environment includes one or more sets of trusted code.

6. The system of claim 1, wherein the secure communications component switches between a secure mode and an unsecure mode, the secure communications component saves and restores processor state of the trusted and untrusted execution environments based on mode.

7. The system of claim 1, wherein the secure communications component establishes the secure communications channel in response to a call, the channel based on kernel-mode drivers one of which initiates a secure mode.

8. The system of claim 1, wherein the secure communications component establishes the secure communications channel based on libraries at a language runtime level of the trusted and untrusted execution environments, and communications drivers at a system support level of the trusted and untrusted execution environments.

9. The system of claim 1, further comprising a bootstrap component that first boots the mobile device into a secure mode and runs a secure bootloader to establish the trusted execution environment, and thereafter, invokes an untrusted bootloader to execute a standard boot sequence for the operating system.

10. The system of claim 1, wherein the operating system cannot access the trusted execution environment.

11. A computer-implemented execution method, comprising the acts of:
creating a trusted execution environment in a mobile device using processor-based isolation extensions, wherein trusted code and data in the trusted execution environment are inaccessible from inspection by untrusted code;
establishing a secure communications channel between the trusted execution environment and an untrusted execution environment;
identifying a portion of the trusted code of an application as code to be executed within the trusted environment, the portion of the trusted code defining an interface that identifies data communicated between the trusted execution environment and the untrusted execution environment;
executing the portion of trusted code of the application in the trusted execution environment based on the identifying, and further executing a portion of untrusted code of the application in the untrusted execution environment, wherein the application comprises the portion of trusted code and the portion of untrusted code that is not executed in the trusted execution environment;
communicating a call to the portion of trusted code in the trusted execution environment over the secure communications channel, the call generated in response to an invoked method of the portion of untrusted code of the application;
returning arguments and values to the portion of untrusted code of the application in the untrusted execution environment over the secure communications channel, based on the call; and
utilizing a processor that executes instructions of the portion of trusted code of the application in the trusted execution environment and the portion of untrusted code of the application in the untrusted execution environment.

12. The method of claim 11, wherein the trusted execution environment is absent of an operating system.

13. The method of claim 11, further comprising authenticating the mobile device based on a cryptographic device identifier of the mobile device.

14. The method of claim 11, further comprising encrypting and binding data to the mobile device and a specific portion of trusted code in the trusted execution environment of the mobile device.

15. The method of claim 11, further comprising destroying the trusted execution environment by destroying an associated container of the code and data.

16. The method of claim 11, further comprising:
executing a secure bootloader to load a trusted language runtime image into memory and perform an integrity check on the image;
initiating trusted language runtime initialization code to create the trusted execution environment; and
thereafter executing a bootloader in the untrusted execution environment to further execute an operating system boot sequence to create the untrusted execution environment.

17. The method of claim 11, wherein the trusted execution environment is inaccessible to an operating system of the mobile device.

18. A computer-implemented execution method, comprising the acts of:
creating a trusted execution environment in a mobile device using processor-based isolation extensions, wherein trusted code and data in the trusted execution environment are inaccessible from inspection by untrusted code;
defining an interface in a portion of trusted code of an application, the application comprising the portion of trusted code and a portion of untrusted code, wherein the interface identifies data communicated between the portion of trusted code executing in the trusted execution environment and the portion of untrusted code executing in an untrusted execution environment;
isolating the portion of trusted code from inspection by the portion of untrusted code and operating system of the mobile device using the trusted execution environment;
establishing a secure communications channel between the trusted execution environment and the untrusted execution environment using kernel mode device drivers;
executing the portion of trusted code in the trusted execution environment, and further executing a portion of untrusted code of the application in the untrusted execution environment;
communicating a call over the secure communications channel to the portion of trusted code and returning data over the secure communications channel to the portion of untrusted code executing in the untrusted execution environment; and
utilizing a processor that executes instructions stored in memory corresponding to running the portion of trusted code of the application in the trusted execution environment and the portion of untrusted code of the application in the untrusted execution environment.

19. The method of claim 18, further comprising executing a secure bootloader to create the trusted execution environment and thereafter executing a bootloader to create the untrusted execution environment.

20. The method of claim 18, further comprising creating the trusted execution environment absent utilization input-output interfaces and input-output device drivers in the trusted execution environment.

21. The method of claim 18, further comprising storing and restoring processor state when switching between a secure mode and an unsecure mode.

22. The method of claim 18, wherein the trusted execution environment is absent of an operating system.

23. The method of claim 18, wherein the trusted execution environment is inaccessible to the operating system of the mobile device.

24. computer-implemented execution system, comprising:
    an untrusted execution environment of a mobile device where an operating system and untrusted code of an application execute;
    a trusted execution environment of the mobile device where trusted code of the application executes, wherein the trusted code, data and execution of the trusted code in the trusted execution environment are inaccessible from inspection and modification by the execution of the untrusted code in the untrusted execution environment, the trusted code defining an interface that identifies data communicated between the trusted execution environment and the untrusted execution environment;
    a secure communications component of the mobile device that provides a secure communications channel between the trusted code executing in the trusted execution environment and the untrusted code executing in the untrusted execution environment; and
    a runtime component of the mobile device that identifies the trusted code of the application and enables the trusted code of the application to be executed in the trusted execution environment,
    wherein the runtime component executes computer-executable instructions of the untrusted code of the application within the untrusted execution environment and the trusted code of the application within the trusted execution environment.

* * * * *